United States Patent [19]
Lackey et al.

[11] Patent Number: 5,620,356
[45] Date of Patent: Apr. 15, 1997

[54] ROW TOOL BALANCE AND BOW CORRECTION APPARATUS

[76] Inventors: Stanley Lackey; Lauren Lackey; Gordon Grosslight, all of 5144 Commerce Ave., Unit A, Moorpark, Calif. 93021

[21] Appl. No.: 379,791

[22] Filed: Jan. 27, 1995

[51] Int. Cl.$^6$ .................................................. B24B 49/00
[52] U.S. Cl. ............................................ 451/5; 29/603.09
[58] Field of Search ............................. 451/1, 5, 8, 28, 451/55, 364; 29/701–703, 603.09, 603.16, 603.17, 603.12

[56] References Cited

U.S. PATENT DOCUMENTS

| | | | |
|---|---|---|---|
| 4,014,141 | 3/1977 | Riddle et al. | 451/1 |
| 4,256,535 | 3/1981 | Banks | 451/28 |
| 4,689,877 | 9/1987 | Church | 451/1 |
| 4,912,883 | 4/1990 | Chang et al. | 451/5 |
| 4,914,868 | 4/1990 | Church et al. | 29/603.09 |
| 5,095,613 | 3/1992 | Hussinger et al. | 29/603.17 |
| 5,203,119 | 4/1993 | Cole | 451/55 |
| 5,463,805 | 11/1995 | Mowry et al. | 451/1 |

Primary Examiner—D. S. Meislin
Assistant Examiner—Andrew Weinberg
Attorney, Agent, or Firm—Roger A. Marrs

[57] ABSTRACT

A magnetic resistive head lapping system is disclosed herein which incorporates an automatic applied force lapping fixture for row tool balance and bow correction. The fixture is mounted over a rotatable lapping plate and is effective to present a row tool or slider bar with magnetic heads deposited thereon to the abrasive surface of the lapping plate in proper orientation during batch fabrication of the magnetic heads. The fixture includes a stationary assembly and a movable assembly on which the row tool and slider bar are carried. A pair of electromagnetic actuators on the stationary assembly correct for balance while three electromagnetic coils on the movable assembly correct for row tool bow. A closed loop control system employs multiplexed lapping signals derived from electrical lapping guides or resistors carried on the slider to calculate forces required to correct for row tool balance and bow which are then introduced to the electromagnetic actuators for adjusting the row tool bending moments and for moving the movable assembly in relation to the lapping plate.

5 Claims, 7 Drawing Sheets

ROW TOOL BALANCE AND BOW CORRECTION APPARATUS

BACKGROUND OF THE INVENTION

1. Field of the Invention

The present invention relates to the field of closed loop lapping systems and more particularly to a novel magnetic resistive head lapping system having electromagnetic actuators effective to correct balance and bow of a workpiece or row tool in response to sensing signals derived from resistive measurements on the workpiece.

2. Description of the Prior Art

Magnetic heads are used extensively in data processing systems, such as disk drives. During head production, batch fabrication is employed whereby a multiplicity of transducers are deposited in a row on a ceramic bar for lapping, polishing and processing simultaneously. The ceramic bar serves as a support or substrate for the transducers and subsequently is divided into head slider elements. During the manufacture of magnetic heads or head sliders with thin film transducers, the pole tips at which the transducing gap is disposed are ground and lapped to achieve a desired throat height at which optimum data signal processing can be realized. The throat height of all the transducers made during a production run for use with a data storage product must be maintained within a defined limited tolerance.

A problem that exists during the lapping process is row bow, which is a condition wherein the ceramic bar is stressed and assumes an undesirable curvature. As a result, the transducer pole tips that encompass the transducing gap are differently aligned relative to the lapping plate and therefore are lapped at different rates. This condition would result in different throat heights for the transducers disposed along the ceramic bar. Prior art lapping systems employ optical guides or electrical lapping guides that indicate changes in the electrical and magnetic characteristics of the head circuit, which are used for implementing manual lapping. The prior art approach is time-consuming, subject to operator error, cannot correct for row bow and does not afford optimum production yield.

Prior attempts to correct for ceramic bar or slider bar distortion is disclosed in U.S. Pat. No. 5,203,119. However, problems have been encountered which stem from the use of a mechanical plunger operable in response to sensed transducer signals to apply pressure to critical locations on the row tool carrying the slider bar. Movement of the plunger and transfer of the loads from the plunger to the row tool are not always accurate enough to achieve desired bending moments in the row tool. Also, no provision is made in prior devices to adjust for balance or tilt of the row tool prior to the lapping procedure.

Therefore, a long-standing need has existed to provide a lapping apparatus which includes means for adjusting for balance and bow of a row tool which is accurate and which eliminates frictional forces normally encountered when employing strictly mechanical pressure-applying techniques. Such a means should include accurate sensing of row tool structural condition with respect to bow or curvature and such signals should be applied to actuating means for applying load transfer moments to the row tool for adjustment purposes.

SUMMARY OF THE INVENTION

Accordingly, the above problems and difficulties are avoided by the present invention which provides a novel automated system for lapping air-bearing surface of magnetic heads which includes a lapping machine having a rotary lapping plate over which is positioned, a row tool and actuator fixture. The fixture includes a stationary member to which a movable or floating member is attached. Electromagnetic actuators are carried on the fixed or stationary member which operate to position the movable member with respect to balance, pitch and bow of the row tool carried thereon. Electromagnetic actuators are carried on the movable member operable to effect the adjustment of row tool bow. Resistive sensors are included on the row tool for sensing bending moments and for energizing the electromagnetic actuators accordingly. The signals produced by the resistive sensors are representative of the magnetic field characteristics of the magnetic heads carried on the row tool via a slider bar. Such means are carried on the fixture for mechanically interconnecting the electromagnetic actuators with the row tool so that the movement of the actuators is transferred to the row tool.

Therefore, it is a primary object of the present invention to provide electromagnetic actuators for use with power amplifiers to control the currents into the actuators and which are used to minimize the undesirable effects of mechanical backlash, mechanical hysteresis and to provide a linear force over the region that the row tool moves.

Another object of the present invention is to employ a lapping apparatus for adjusting a row tool with respect to a rotary lapping plate which takes into account correction for row tool balance and row tool bow.

Another object of the present invention is to provide a novel lapping system which senses electrical lapping resistors or magneto resistive elements that are being lapped on a row tool and which converts these resistance values to throat heights (or stripe heights) and then bends the row tool dynamically to correct for both row bow and balance.

A further object of the present invention is to provide a novel electrical lapping guide system employed in a closed loop control network capable of sampling resistive values every 30 milliseconds and to provide for row tool balance/bow corrections up to 33 times per second.

Another object resides in providing electrical lapping guide or resistive readings for every row ELG slider during an entire lapping cycle and wherein the readings are stored in memory for further procedural use, such as comparison or the like.

Yet a further object of the present invention is to provide a lapping machine capable of correcting row tool balance and bow which incorporates electromagnetic actuators, such as voice coils or the like, and which are coupled to power amplifiers so as to eliminate difficulties inherent in stepper motors, pneumatics and other pressure-applying devices because of difficulties in mechanical, resolution and linearity characteristics.

A further object resides in the provision in a lapping apparatus having a row tool that employs at least three electromagnetic coils to achieve row tool bending during the lapping procedure and which employs two electromagnetic actuators to provide balance loading for unequal loads across the row tool.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

DESCRIPTION OF THE PREFERRED EMBODIMENT

Figure 1:
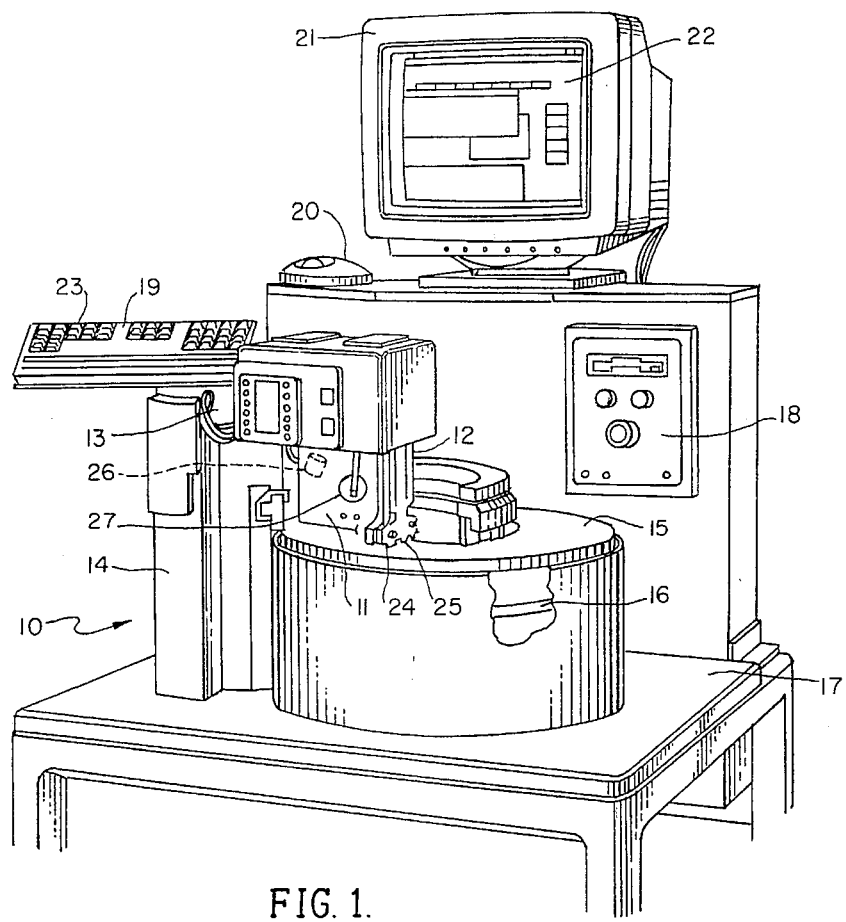
FIG. 1 is a front perspective view of a lapping apparatus employing the novel electromagnetic actuator means for correcting row tool balance and bow.

Referring to FIG. 1, the novel lapping system and apparatus of the present invention is indicated in the general direction of arrow 10 which includes a stationary assembly 11 and a floating or movable assembly 12, both of which downwardly depend from a control arm 13. The control arm includes various input and output control buttons and switches and is cantilevered from a post 14 over a rotary lapping table 15. The surface of the table is covered with an abrasive material and is rotatably mounted on a base 16. The apparatus is carried on a table 17 and may further include monitoring instruments, such as indicated by numerals 18, 19, 20 and 21. Instrument 21 includes a visual CRT tube presentation of information which may be in the form of graphics, alpha/numeric indicia or the like. The screen is indicated by numeral 22. The instrument 19 may include a keyboard input 23 for introducing a variety of system control signals to the apparatus.

FIG. 1 also illustrates that the floating or movable assembly 12 carries a row tool 24 on which is mounted a slider 25 carrying a plurality of electrical lapping guides for magneto resistive elements in close proximity to the abrasive surface of the lapping table 15. The system reads the electrical lapping guides or magneto resistor elements by sensing the resistance values thereof while the elements are being lapped on the slider of the row tool. These resistance values are converted to throat heights or stripe heights and then the apparatus bends the row tool dynamically to correct proposed row bow and balance. Balance is corrected by means of a pair of electromagnetic actuators 26 while row tool bow is corrected by three electromagnetic actuators 27, 27' and 27" carried on the floating assembly 12.

Figure 2:
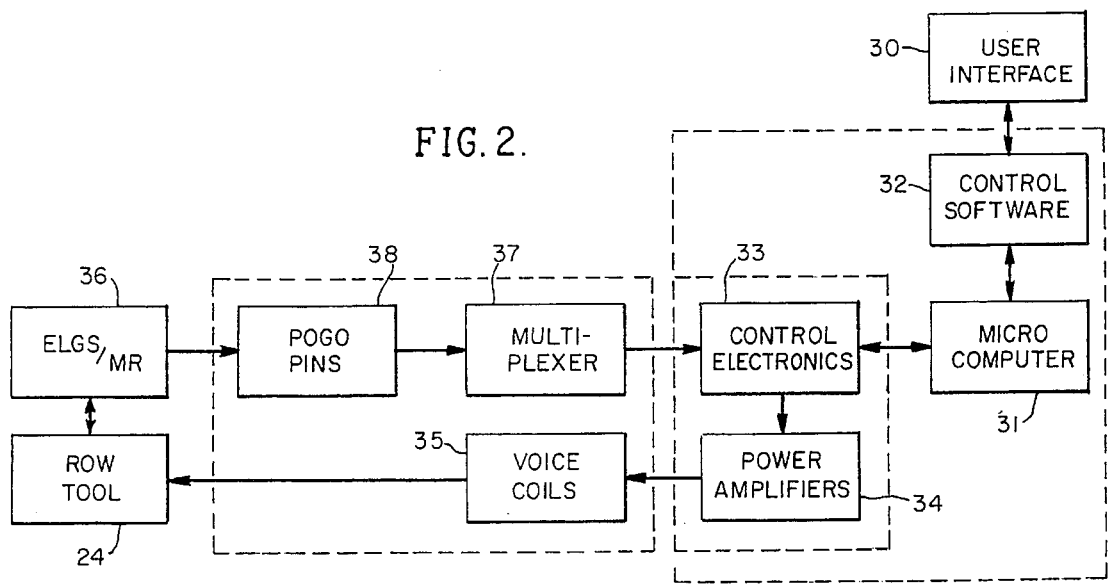
FIG. 2 is a diagrammatic block diagram showing the system for controlling the electromagnetic actuators.

Referring now in detail to FIG. 2, the user interface 30 includes all of the instruments illustrated in FIG. 1 and represented by numerals 18–23 respectively. The user interface is connected to a micro-computer 31 by means of suitable software 32 and the micro-computer is connected to electronic controls 33 that operate power amplifiers 34. The power amplifiers are directly coupled to the electromagnetic actuators or voice coils 35 and when actuated, these coils correct for any out of balance or out of bow characteristics of the row tool 24. The row tool carries a plurality of ELG elements or MR elements as indicated by numeral 36. As these elements are continuously being sent, signals are introduced to a multiplexer 37 via a plurality of detachably connected pins 38 which interconnect the row tool 24 with the movable or floating fixture assembly 12. The multiplexed signals are then introduced to the control electronics 33 and via comparison with stored information in the microcomputer, correction signals are then fed into the power amplifiers and through the voice coils to the row tool for correction. Balance correction is handled before the lapping operation or procedure commences while row tool bow as well as balance is dynamically introduced during the lapping procedure. The inventive lapping system can accommodate digital, analog, digital/analog, or analog with calibration depending on ELG design. The MR element option measures the MR element directly. ELG data, including the resistance data for every slider for every sample during the entire lapping cycle, is stored in the microcomputer memory which is available in real-time to the control algorithm.

With respect to the MR element, the voltages are protected by the measurement circuitry and the voltage on each side of an MR element is held symmetrically with respect to ground MR element. The maximum voltage of either side of the lap plate is less than 100 mV with respect to the lap plate.

Figure 3:
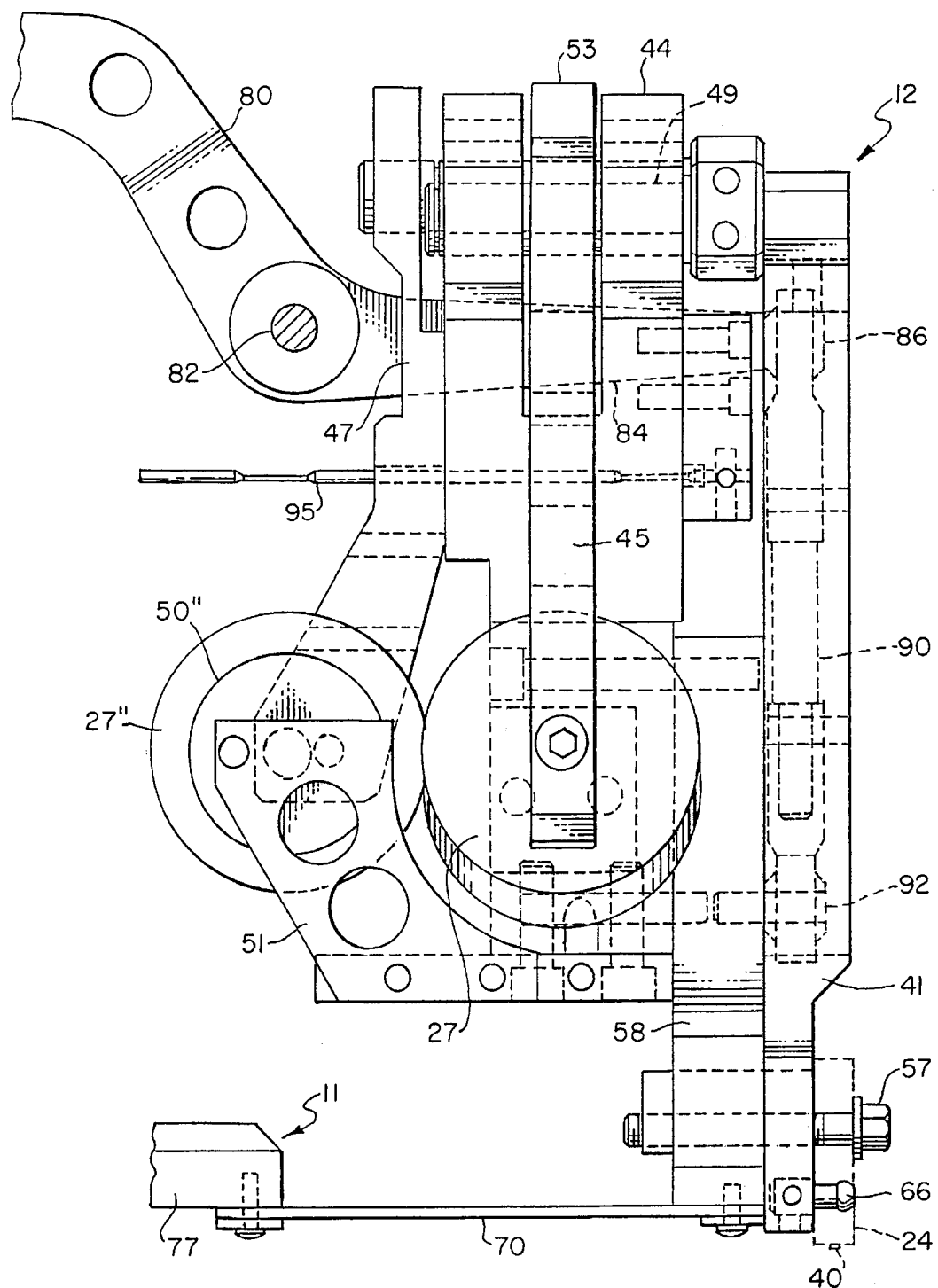
FIG. 3 is a side elevational view of the movable or floating head assembly.
Figure 4:
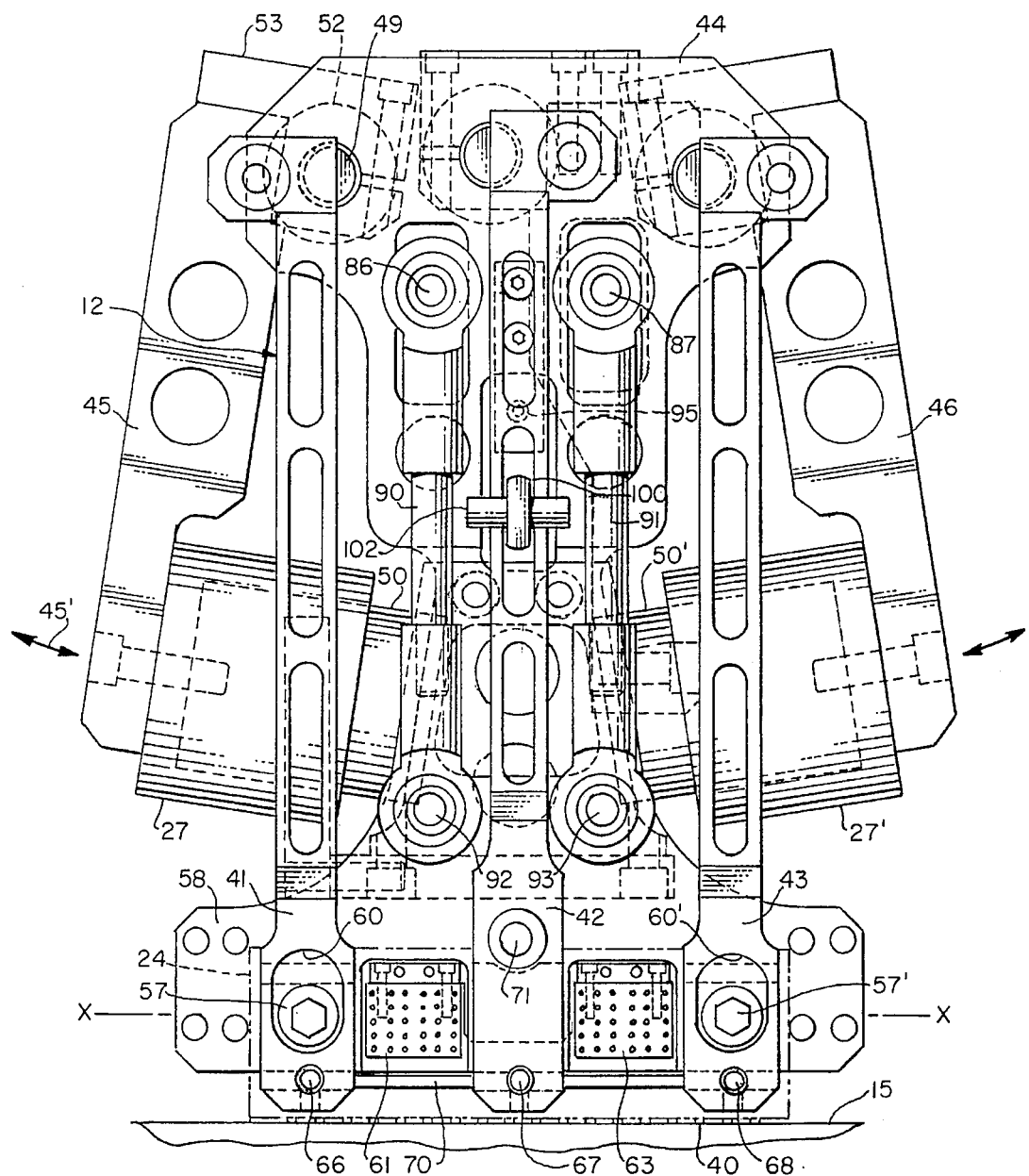
FIG. 4 is a front elevational view of the floating and balance actuators.
Figure 7:
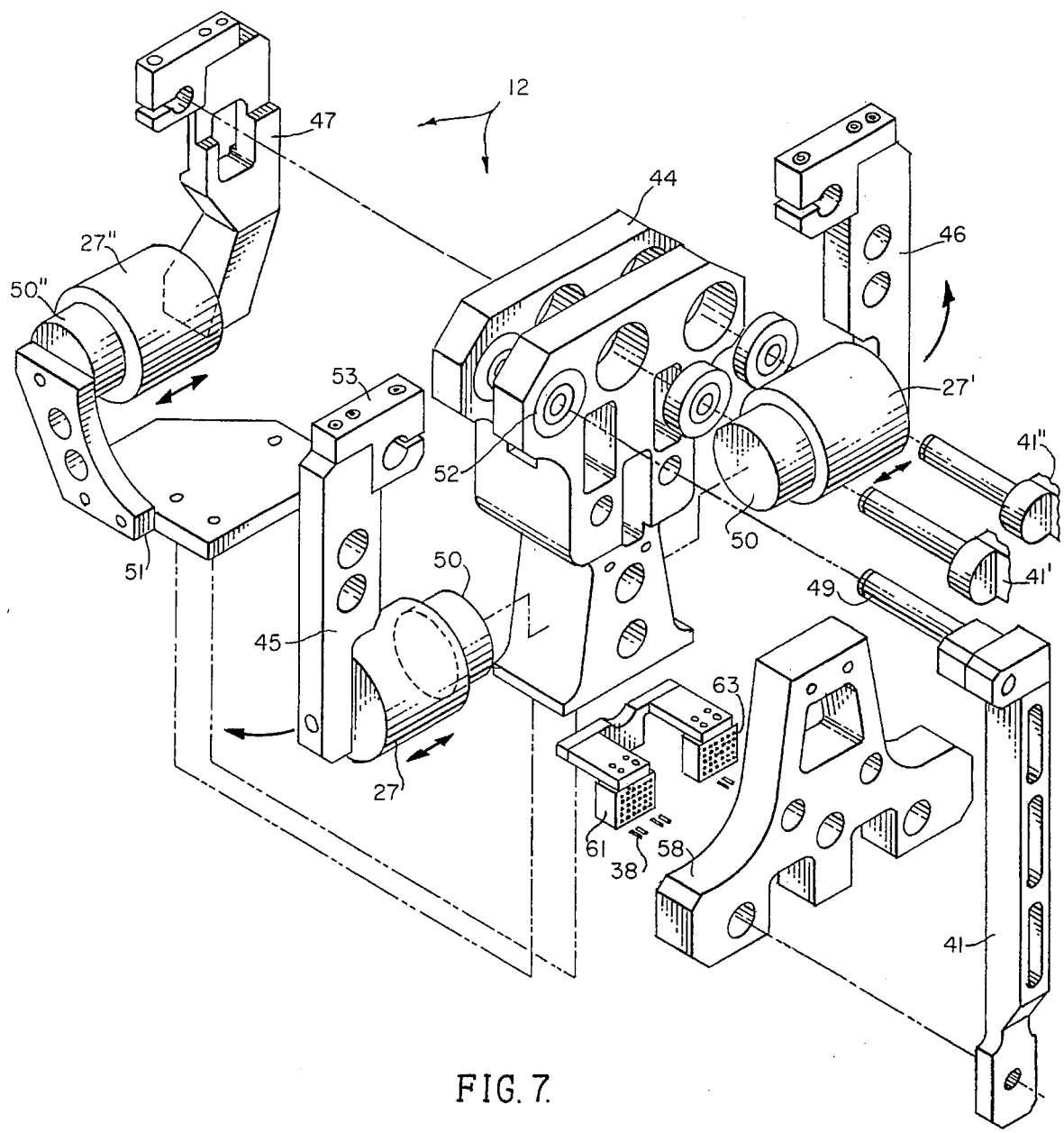
FIG. 7 is an exploded perspective view illustrating the movable or floating head member or assembly incorporated into the lapping machine shown in FIG. 1.

Referring now to FIG. 4, it can be seen that the row tool 24, as illustrated in broken lines, is carried on a back plate 58 behind the ends of struts 41, 42 and 43 which are arranged in fixed spaced-apart parallel relationship and which downwardly depend from a base member 44. The row tool includes a plurality of heads 40 which are intended to be lapped by the abrasive surface of the lapping table 15. The opposite ends of the struts are pivotally carried on the upper end of member 44 so that the lower end of the struts may readily flex or contort to adjust the row tool in response to lateral pivotal movement of magnetic actuator arms 45 and 46 and rear actuator arm 47, as shown in FIGS. 3 and 7.

The magnetic actuators shown in FIGS. 3 and 4 employed for correcting the row tool bow are indicated by numerals 27, 27' and 27". As illustrated more clearly in FIG. 7, each magnetic actuator includes a fixed core and numeral 50 illustrates the core associated with coil 27 while core 50' is associated with coil 27' and core 50" is associated with coil 27". The cores are fixed to opposite sides of member 44 regarding cores 50 and 50' while core 50" is carried on a fixture 51 which is secured to the member 44 (See FIG. 3). Therefore, when the coils 27, 27' and 27" are energized, electromagnetic forces are generated with respect to the fixed cores so that arms 45, 46 and 47 will pivot about their connections on the top of member 44. The arms 45, 46 and 47 are coupled to the three struts 41, 42 and 43 by means of pins, such as pin 49 associated with strut 41 in FIG. 7 which is rotatably mounted on the member 44 via a bearing set 52. The top of member 44 takes the form of a yoke in which a clamp 53 carried on the upper end of arm 45 fixedly engages with the pin 49. Therefore, it can be seen that as the arm 45 moves laterally with respect to the member 44 as shown by arrow 45 in FIG. 4, the movement is converted into rotation of the pin 49 and consequently, the movement is transferred to the strut 41. The same action is repeated with respect to arms 46 and 47 and their clamped engagement with pins carried on the struts 42 and 43. As previously noted, the electromagnetic actuators 27, 27' and 27" along with their associated cores 50, 50' and 50" relate to the bending of the row tool in order to correct for bow. This correction is achieved via pivotal action of the arms 45, 46 and 47 which, in turn, rotate their respective pins, such as pin 49, so that the movement is translated into the struts 41, 42 and 43 which have their terminating ends contacting the row tool 24.

Figure 5:
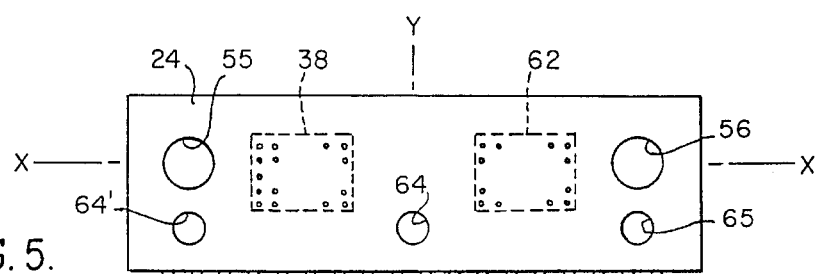
FIG. 5 is an enlarged front elevational view of a row tool carried on the fixture shown in FIG. 4.
Figure 6:
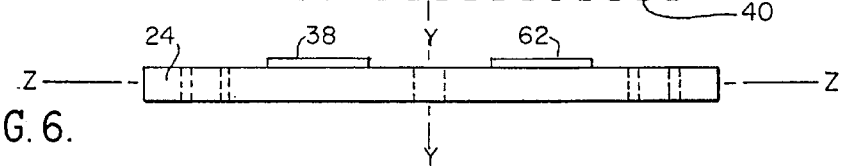
FIG. 6 is a top view of the row tool shown in FIG. 5.

In connection with mounting of the row tool on the terminating ends of struts 41, 42 and 43, attention is directed to FIGS. 4–6 inclusive wherein it can be seen that the row tool 24 is provided with attachment apertures at each end thereof as represented by numerals 55 and 56. Row tool bolts 57 and 57' pass through these apertures 55 and 56 and threadably engage with the back plate 58. The attachment bolts pass through elongated apertures 60 and 60' formed in the terminating ends of struts 41 and 43 respectively whereby the back side of the row tool 24 bears against the struts 41, 42 and 43. It is also to be noted that printed circuit boards or pin connectors 61 and 63 are mounted on plate 58 and are coupled with connector pads 38 and 62 respectively. Pads 38 and 62 are carried on opposite ends of the row tool and mate with pads 61 and 63 when the row tool is mounted on the back plate. In this manner, the electrical connection is made between the plurality of magnetic heads 50 or elements 40 with the connection pads and then to the multiplexer 37, as previously described with respect to FIG. 2. Furthermore, the row tool 24 is provided with apertures 64', 64 and 65 through which bend pins 66, 67 and 68 are inserted as shown in FIGS. 3, 4 and 5.

FIGS. 3 and 4 further illustrate that the guide pins 66–68 inclusive are carried on the end of the struts 41, 42 and 43. A tensioned metal plate 70 which has one end secured to the fixed or stationary assembly 11. The metal plate is employed to support the floating head 12 to the fixed head. The tensioned plate 70 is employed only for applying a tensioned support to the floating head assembly 12. The right and left struts 41 and 43 are arranged to move up and down in response to the radial movement of voice coils 27 and 27'. However, actuation of voice or actuator 27" causes the center strut 42 to move up and down in response to actuator magnets 50" and coils 27". Therefore, the opposite ends of the row tool 24 can be adjusted by the struts 41 and 43 while the center of the row tool can be adjusted and bow corrections made by strut 42. Thus, bow corrections are made by bending the row tool 24 and slider 25 via rough or fine adjustments of the struts 41–43 inclusive in response to the closed loop circuit sensing resistance of the elements 40 and supplying signals to the electromagnetic actuators or voice coils.

Figure 8:
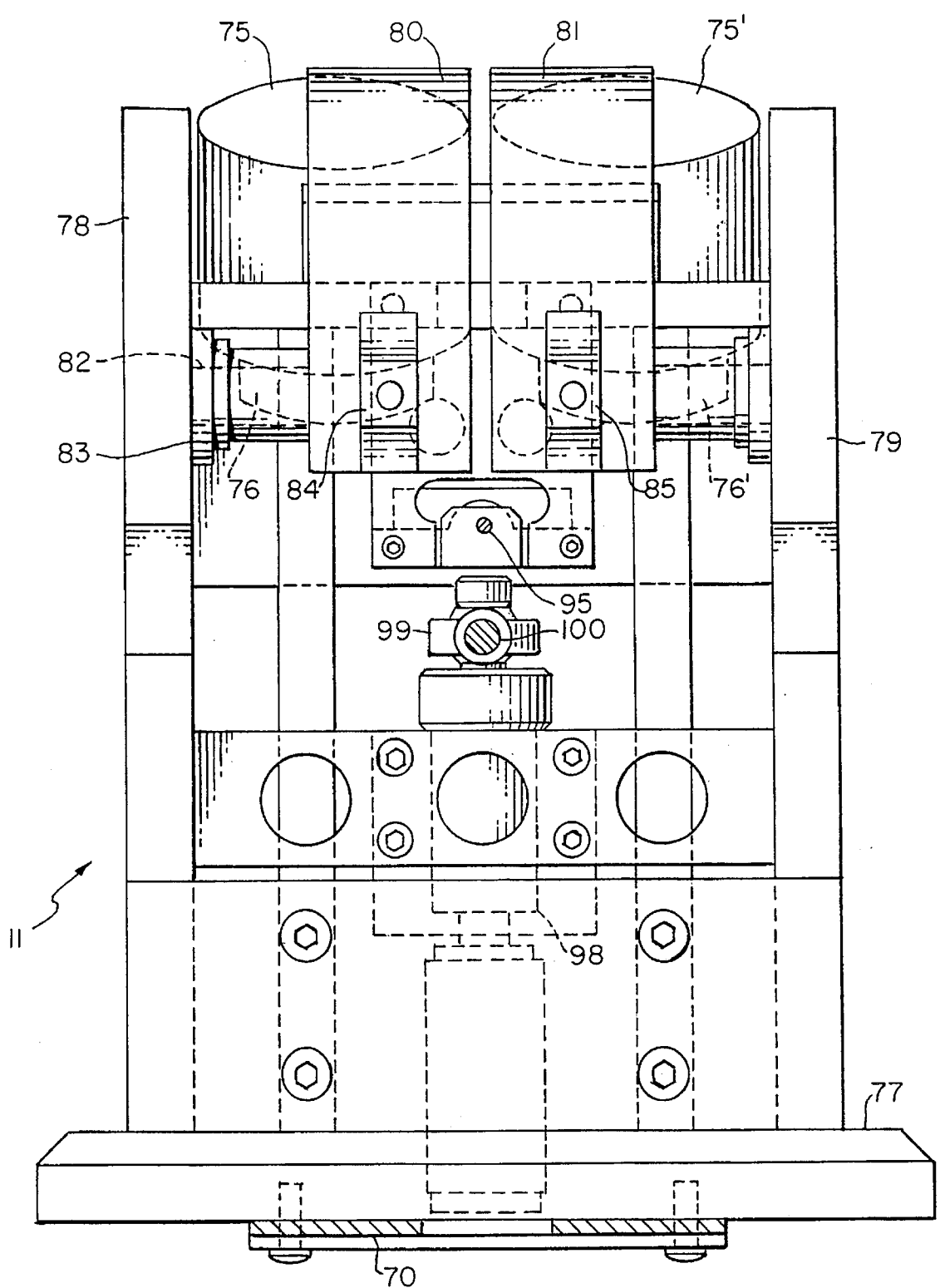
FIG. 8 is a front elevational view of the fixed or stationary head assembly.
Figure 9:
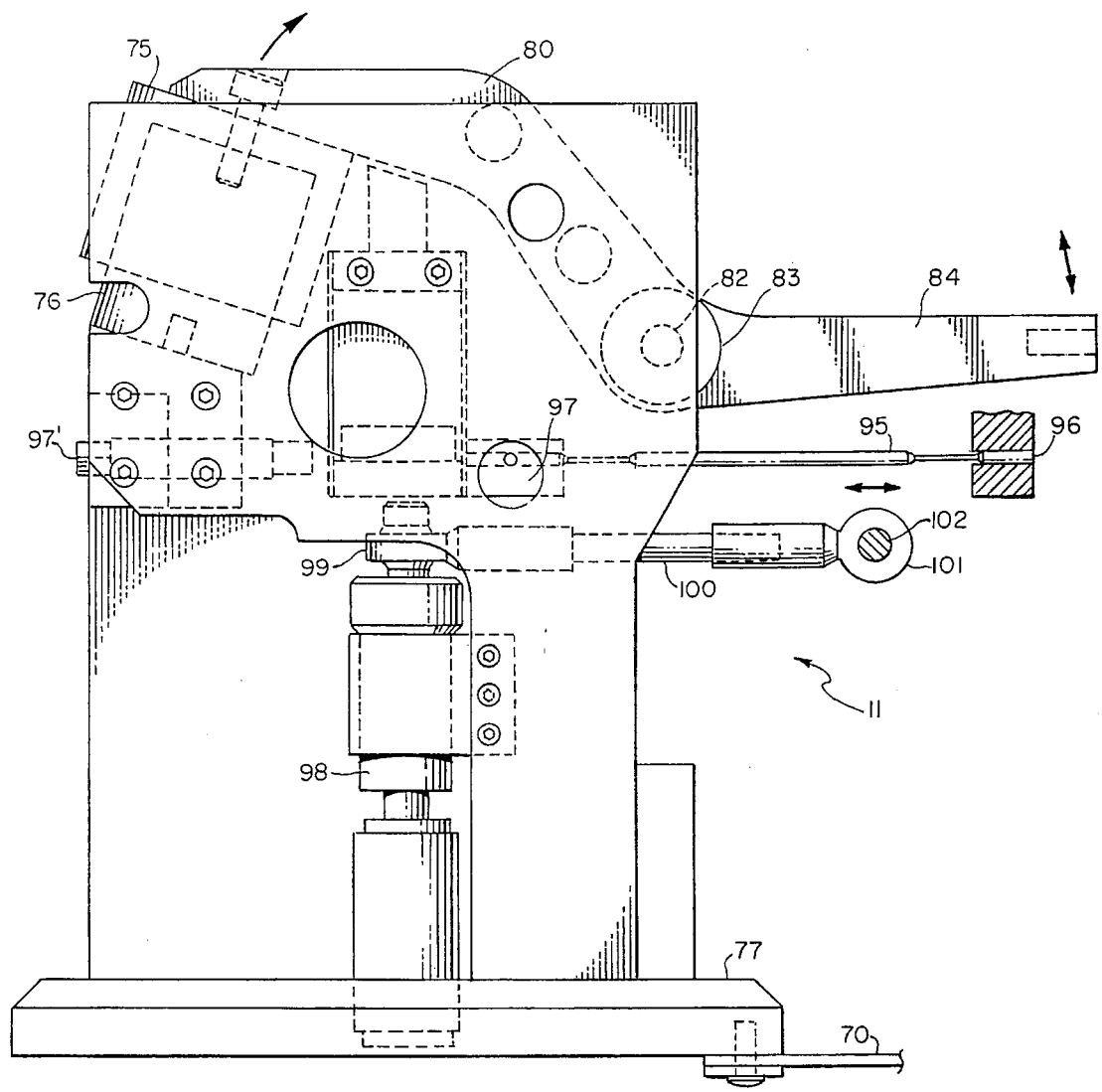
FIG. 9 is a side elevational view of the fixed head assembly.

In order to provide for correction of balance, means are provided on the stationary or fixed assebmly 11 to achieve this correction. The means employs a pair of electromagnetic actuators 75 and 75' which are coils operable when energized to operate electromagnetic force working against cores 76 and 76' respectively. As shown in FIGS. 8 and 9, the means is carried on a fixture 77 having upright spaced-apart plates 78 and 79 between which a pair of mechanical arms 80 and 81 are pivotally carried on a shaft 82 within a bearing 83 that permits a twisting action to be applied to the floating or movable assembly 12. The arms 80 and 81 include an outwardly projecting extension 84 associated with arm 80 and extension 85 associated with arm 81. The extreme terminating ends of the extensions include a threaded aperture for connecting the floating assembly at that point. The connection is shown in FIG. 4 by numerals 86 and 87. These connections secure downwardly depending rods 90 and 91 to connectors 92 and 93 respectively which couple with plate 58.

Means are provided for sensing the tilt portion of the floating head 12, as illustrated in FIG. 9, which include an elongated sensing rod 95 having a probe 96 projecting through a hole in the floating head 12 and in frictional contact therewith. The opposite end of the sensing rod 95 is connected to a linear voltage drive transformer 97 which is connected to the microprocessor for receiving signals therefrom and for utilizing the signals for adjustment purposes. Also, the sensing rod may be adjusted to regulate the tilt by means of a screw 97'. A levelling motor 98 is provided for automatically receiving signals from the microprocessor in order to level the floating head assembly after the device has been calibrated. Such a calibrating procedure is accomplished at the factory and is not usually done in the field. Levelling can be programmed for different angles. The levelling motor operates through a bearing 99 at the end of a rod 100 which terminates in a pivot connection 101 with a rod 102 attached to floating head 12.

Figure 10:
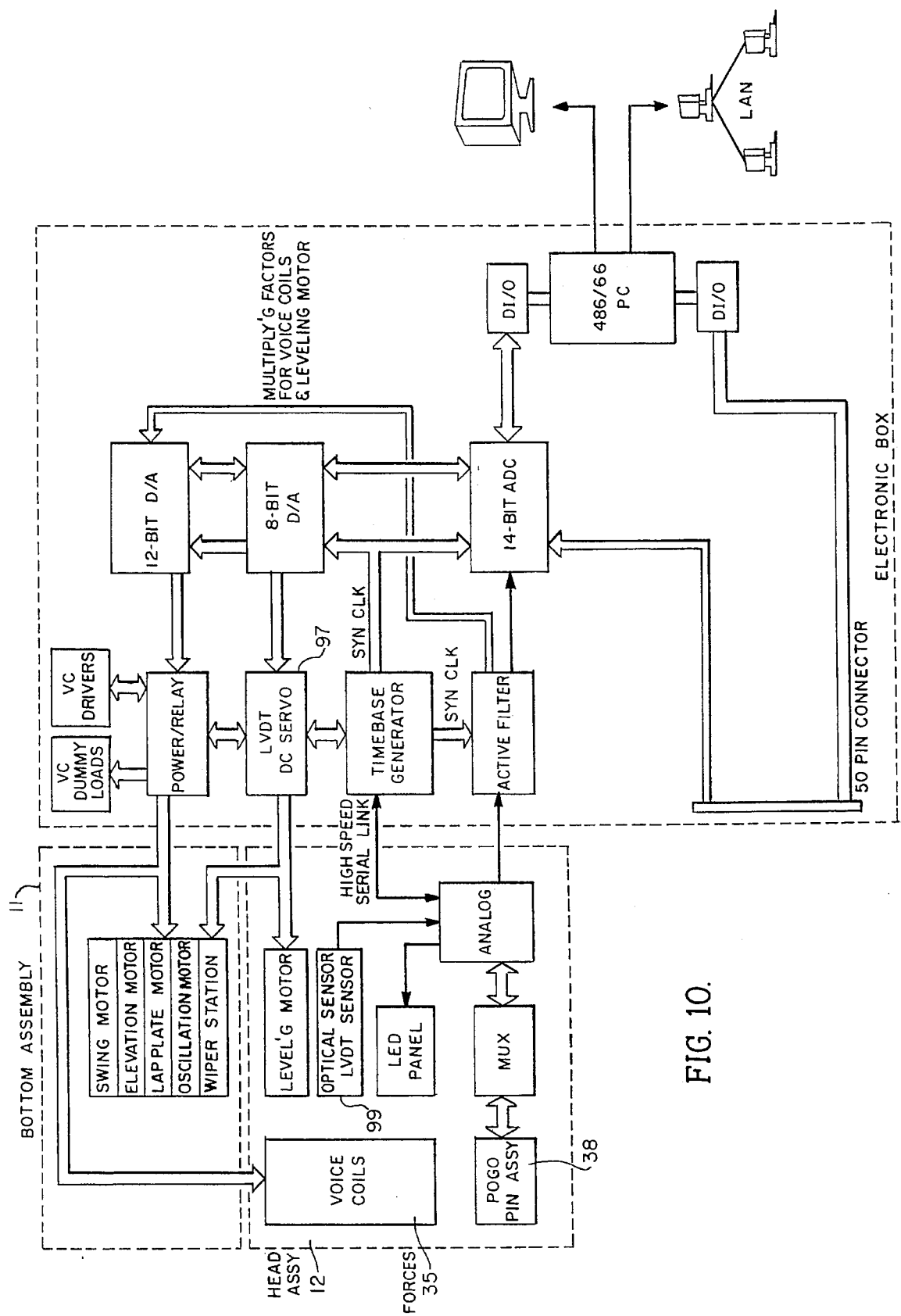
FIG. 10 is a diagram illustrating the information flow for actuating the electromagnetic actuators or voice coils used in the head assemblies.

FIG. 10 sets forth an overall block diagram illustrating the various functions and means for achieving balance and bow correction control. The thin film or magneto resistive head lapping system and apparatus of the present invention is a closed loop control system that senses the resistance of electrical lapping guides or resistors (ELG) located on the slider 25 of the row tool 24. The electromagnetic actuators or voice coils 75 and 75' are located in the fixed assembly 11 and these actuators apply two forces to the row tool in order to correct for balance. Balance means correction for left and right tilt are provided for in the row tool. The three electromagnetic actuators or voice coils 27, 27' and 27" are carried on the floating assembly 12 and apply the forces necessary to bend the row tool for correction of row bow. The system through the diagram shown in FIG. 10 samples the ELGs every 30 ms and sends correction signals for row bow and balance 33 times per second. The pogo pins, located on the floating assembly 12, connect to the ELG to the system. The electrical signals of all the ELGs located on the row tool, are multiplexed together which allows the system to read and sense more data. The control network consists of control electronics, such as a 486-66 microcomputer and control algorithm. The control network processes the data from the ELGs and converts the data into throat height or stripe height. The system uses the throat height data to calculate the forces required to correct for row tool bow and balance. The fixed assembly 11 houses the balance electromagnetic actuators, the linear drive voltage transformer and the levelling motor 98. The LVDT and the levelling motor are used to automatically level the floating head assembly 12 in relation to the lap plate 15. The floating head assembly houses the bending electromagnetic actuators, pogo pins and the row tool clamps.

The fixed assembly 11 mounts the two electromagnetic or voice coil actuators 75 and 75' which can apply a maximum force of plus or minus 2.5 lbs. Each electromagnetic actuator consists of a voice coil and a mechanical arm. The voice coil attaches to the fixed head assembly 11 and the magnet or core attaches to the mechanical arm. The mechanical arm has a 1-to-1 force ratio and attaches to the fixed head assembly 11 in the center by a horizontal rod and bearings for free vertical travel. The current in the electromagnetic coils causes the magnet to push in or pull out with a given force that translates to the mechanical arm that then applies an upward or downward force to the tip of the mechanical arm. The tips of the two mechanical arms via their extensions connect to the floating assembly 12 by a pair of tie-rods. This connection allows the floating head to move vertically on the left and right sides of the row tool allowing for tilt adjustment and the balance correction. The fixed head assembly 11 also consists of the levelling motor 98 and the linear drive voltage transformer 97. The linkage assembly attaches the levelling motor's shaft to the floating head assembly 12. The offset in the shaft of the motor allows for the horizontal movement, forward and backward, of the floating head assembly 12. The sensing rod 95 attaches to the floating head assembly and to the LVDT. The sensing rod moves the LVDT when the floating head moves, which causes the LVDT to send a signal to the control system. The LVDT and levelling motor make up the servo system that automatically levels the row tool. This is accomplished by a closed loop feedback network that senses the precise location of the floating head assembly in relation to the lap plate 15 and sends a signal to the levelling motor 98 which adjusts the floating head assembly 12 until the assembly is perpendicular to the lap plate 15 or to a preset ramp angle (–0.5 degree to 1.0 degree).

The floating head assembly 12 consists of the three voice coil or electromagnetic actuators 27, 27' and 27" that bend the row tool at three different points along its length. The three points of bending, allow for correction of a wide variety of shapes associated with row tool bow including second order polynomials. The voice coils attach to a fixed member of the floating head assembly and the magnets attach to the mechanical arms. Current applied to the voice coils causes them to exert a force perpendicular to the rotational arms. Each of the three mechanical arms attach to a vertical rod at the top of the mount and both pieces are held in place by precision bearings for frictionless rotational travel. The vertical struts have pins located at the ends which are used to bend the row tool either up or down when the row tool is placed over the bending pins 66 and secured to the floating head assembly 12 by suitable means. The force applied at each of the pins is a ratio of the distance of the mechanics associated with the vertical rod and the mechanical arms. The maximum force that can be applied by the electromagnetic actuators or voice coils is plus or minus 2.5 pounds and the maximum force that can be exerted vertically at the pins is either plus or minus 15 pounds or plus or minus 50 pounds depending on the mechanical advantage of the mechanical arms and rods. The electromagnetic actuators, with the use of power amplifiers, control the currents in the voice coils and are used to minimize the mechanical backlash, mechanical hysteresis and to provide a linear force over the region that the row tool moves.

With respect to the prior art, other types of bending methods include convention DC motor or stepper motors and experience has disclosed that this procedure and mechanism causes a great deal of mechanical backlash when attempting to bend the row tool. Material expansion through heating the row tool has a slow response time in bending and in recovery of the row tool. Pneumatics, mentioned above, can apply higher forces without mechanical backlash but experiences a lower resolution.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. In an automated system for lapping thin film magnetic heads disposed in row on a bar, the improvement which comprises:

a stationary fixture;

a movable fixture carried on said stationary fixture;

a lapping assembly including a rotary lapping plate;

means for securing said bar in opposition to said lapping plate and comprising a plurality of struts and rods;

means carried on said bar for generating data signals representing throat height during the lapping process;

a data processor coupled to said signal generating means for producing command signals in response to said data signals;

electromagnetic actuator means coupled to said data processor for automatically correcting the balance and bow of said bar relative to said lapping plate via said struts and rods in response to said command signals from said processor;

a first set of said electromagnetic actuators is coupled to said bar via said rods for the correction of balance and a second set of electromagnetic actuators is coupled to said bar via said struts to correct for bow of said bar;

said data processor, said data generating means, said signal generating means and said electromagnetic actuators define a closed loop lapping control system for correction of balance and bow of said bar; and said second set of electromagnetic actuators is carried on an equal numbered set of pivot pins and said struts carried on said set of pivot pins whereby pivotal movement thereof is in response to said data signals applied to said second set of electromagnetic actuators for correction of the bow of said bar.

2. The invention as defined in claim 1 including:

arms pivotally carried on said stationary fixture and each arm having opposite ends;

said first set of electromagnetic actuators coupled to one end of said arms and said rods coupled to the other end of said rods whereby pivotal movement thereof in response to said data signals applied to said first set of electromagnetic actuators for correction of balance of said bar.

3. The invention as defined in claim 2 wherein:

said bar having opposite ends separated by a midsection incorporating a central transverse axis;

three struts arranged in spaced-apart relationship connecting said second set of electromagnetic actuators with said opposite ends and midsection of said bar;

two rods arranged in spaced-apart relationship connecting said first set of electromagnetic actuators to said bar midsection separated by said central transverse axis.

4. The invention as defined in claim 3 wherein:

said movable fixture includes a fixed upright member having opposite sides;

pivotal arms movably carried on said upright member and each arm having a free end cantilevered outwardly from said upright member;

each of said electromagnetic actuators of said second set having a stationary magnetic coil secured to said upright member and a magnet carried on said free end of each of said pivotal arms.

5. The invention as defined in claim 3 wherein:

said movable fixture includes a fixed upright member having opposite sides;

pivotal arms movably carried on said upright member and each arm having a free end cantilevered outwardly from-said upright member;

each of said actuators of said second set having a stationary magnet secured to said upright member and a magnetic coil carried on said free end of each of said pivotal arms.

\* \* \* \* \*